United States Patent [19]

Zwirn

[11] Patent Number: 4,667,238
[45] Date of Patent: May 19, 1987

[54] NONINVASIVE BAD CHANNEL DETECTION AND CORRECTION

[75] Inventor: Robert Zwirn, Los Angeles, Calif.

[73] Assignee: Hughes Aircraft Company, Los Angeles, Calif.

[21] Appl. No.: 775,883

[22] Filed: Sep. 13, 1985

[51] Int. Cl.[4] .............................................. H04N 5/14
[52] U.S. Cl. .................................. 358/166; 360/38.1; 371/31; 382/51
[58] Field of Search .................. 358/166, 167, 160; 371/31; 375/38, 40; 360/38.1; 455/8, 18; 382/51

[56] References Cited

U.S. PATENT DOCUMENTS

4,041,453  8/1977  Umeda ............................... 360/38.1
4,365,304  12/1982  Ruhman ................................ 382/51

Primary Examiner—Howard W. Britton
Attorney, Agent, or Firm—Ronald L. Taylor; A. W. Karambelas

[57] ABSTRACT

A video signal processing technique for detection and correction of the video signal from a bad video channel is disclosed for use with a video imaging system having a plurality of video channels for providing a video signal for a plurality of video scan lines. A disclosed embodiment is a bad channel detection and correction circuit (10) which includes circuitry (11, 13) responsive to a video signal for providing a difference signal indicative of the difference between a first scan line video signal and a second scan line video signal; a first histogram circuit (20, 60) responsive to the difference signal for generating difference histogram data indicative of the number of occurrences of different values of the difference signal; a second histogram circuit (30, 60) responsive to the first scan line video signal for providing video histogram data indicative of the number of occurrences of different values of the first scan line video signal; a circuit for analyzing the difference histogram data and the video histogram data for providing a decision output indicative of whether the second scan line video signal is from a bad video channel (40, 29, 31, 70); and output circuitry (15, 17, 19, 21, 23, 25, 27) responsive to the analyzing circuit for providing a delayed output signal corresponding to (a) the second scan line video signal when the decision output indicates both lines are from good video channels, or (b) a substituted value for the second scan line video signal when the decision output signal indicates that the second scan line video signal is from a bad channel.

27 Claims, 15 Drawing Figures

TABLE I
(GOOD LINE)

| P/V | V_S (X-AXIS) | HS_S (Y-AXIS) | AREA |
|---|---|---|---|
| V1 | 39 | 9 | 57 |
| P1 | 40 | 12 | 54 |
| V2 | 44 | 7 | 49 |
| V3 | 63 | 27 | 135 |
| P2 | 64 | 29 | 139 |
| V4 | 65 | 25 | 137 |
| P3 | 66 | 27 | 132 |
| V5 | 69 | 18 | 110 |
| P4 | 73 | 26 | 111 |
| V6 | 74 | 22 | 119 |
| P5 | 75 | 28 | 124 |
| V7 | 77 | 25 | 129 |
| P6 | 79 | 29 | 136 |
| V8 | 83 | 10 | 90 |
| P7 | 90 | 26 | 112 |

FIG. 9

TABLE II
(GOOD LINES)

| P/V | V_diff (X-AXIS) | HS_diff (Y-AXIS) | AREA |
|---|---|---|---|
| V1 | 50 | 15 | 78 |
| P1 | 63 | 57 | 245 |
| V2 | 64 | 46 | 251 |
| P2 | 65 | 48 | 248 |
| V3 | 67 | 39 | 217 |
| P3 | 69 | 50 | 222 |
| V4 | 77 | 7 | 69 |
| P4 | 78 | 8 | 45 |

FIG. 10

TABLE III
(GOOD LINE, BAD LINE)

| P/V | $V_{diff}$ (X-AXIS) | $HS_{diff}$ (Y-AXIS) | AREA |
|---|---|---|---|
| P1 | 36 | 16 | 76 |
| V1 | 37 | 14 | 78 |
| P2 | 38 | 18 | 78 |
| P3 | 51 | 13 | 44 |
| V2 | 52 | 12 | 53 |
| V3 | 59 | 15 | 91 |
| P4 | 60 | 17 | 86 |
| V4 | 61 | 14 | 82 |
| P5 | 63 | 17 | 79 |
| V5 | 64 | 15 | 85 |
| P6 | 65 | 23 | 93 |
| V6 | 66 | 22 | 101 |
| P7 | 68 | 33 | 132 |
| V7 | 69 | 30 | 140 |
| P8 | 70 | 31 | 146 |
| P9 | 77 | 23 | 100 |
| V8 | 78 | 22 | 107 |
| P10 | 82 | 31 | 136 |
| V9 | 92 | 7 | 51 |
| P11 | 93 | 8 | 37 |

TABLE IV

|  | GOOD LINE | GOOD LINES DIFF | SCORE | BAD LINE DIFF | SCORE |
|---|---|---|---|---|---|
| PEAKS | 7 | 4 |  | 11 |  |
| PRATIO |  | 4/7 |  | 11/7 |  |
|  |  | <1 | 0 | <2 | A3 |
| VALLEYS | 8 | 4 |  | 9 |  |
| VRATIO |  | 4/8 |  | 9/8 |  |
|  |  | <1 | 0 | <1.33 | A2 |
| SUBTOTAL SCORE |  |  | 0 |  | A2+A3 |
| COMPARE |  |  |  | 36 |  |
| PEAKS | 40 |  | 0 | 38 | B1 |
|  |  |  |  | 51 |  |
|  |  |  |  | 60 |  |
|  | 64 | 63 | B1 | 63 | B1 |
|  | 66 | 65 | B1 | 65 | B1 |
|  |  |  |  | 68 |  |
|  | 73 | 69 | B1 | 70 | B1 |
|  | 75 | 78 | B1 | 77 | B1 |
|  | 79 |  | 0 | 82 | B1 |
|  | 90 |  | 0 | 93 | B1 |
| SUBTOTAL SCORE |  |  | 4B1 |  | 7B1 |
| COMPARE | 39 |  | 0 | 37 | C1 |
| VALLEYS | 44 |  | 0 |  | 0 |
|  |  | 50 |  | 52 |  |
|  |  |  |  | 59 |  |
|  | 63 |  | 0 | 61 | C1 |
|  | 65 | 64 | C1 | 64 | C1 |
|  |  |  |  | 66 |  |
|  | 69 | 67 | C1 | 69 | C1 |
|  | 74 |  | 0 |  | 0 |
|  | 77 | 77 | C1 | 78 | C1 |
|  |  |  |  | 83 |  |
|  |  |  |  | 92 |  |
| SUBTOTAL SCORE |  |  | 3C1 |  | 5C1 |
| TOTAL SCORE |  |  | 4B1+3C1 |  | A2+A3+ 7B1+5C1 |

NONINVASIVE BAD CHANNEL DETECTION AND CORRECTION

BACKGROUND OF THE INVENTION

The disclosed invention relates to video imaging systems, and is more particularly directed to a video signal processing technique for detection and correction of bad video channels.

AC coupled video imaging systems are utilized to provide video images of a scanned object scene. The scene being "looked at" is mechanically scanned (e.g., by a scan mirror) to provide optical radiation inputs to a plurality of detector elements, each of which is a channel that provides a detector output. The detector outputs are respectively AC coupled to amplifier stages which provide amplifier video signals. The amplifier video signals provided by the amplifier stages are utilized to produce a human observable display on an output transducer such as a CRT display or are further processed. As is well known, a video frame may include one or more fields where a plurality of fields are interlaced. On a video display, each video line of a field corresponds to the output of one detector element.

If one or more channels are bad (i.e., noisy or failed), the video signal is of reduced utility for further processing, and further results in a distorted video image. Typically, the bad channels are tolerated until sufficient problems occur to justify repair or maintenance procedures. Pursuant to such procedures, a channel adjacent a bad channel is hard wired to also provide the video signal for the bad channel. Alternately, the bad channels may be repaired or maintained as needed, which would result in unwanted down time.

SUMMARY OF THE INVENTION

It would therefore be an advantage to provide for video imaging systems a circuit for detection and correction (or compensation) of bad video channels.

It would also be an advantage to provdie for video imaging systems a circuit for detection and correction of bad video channels which is readily added to previously installed video imaging systems.

Another advantage would be to provide for video imaging systems a circuit for detection and correction of bad video channels which avoids substantial reduction of the utility of the video signals.

Still another advantage would be to provide for video imaging systems a circuit for detection and correction of bad video channels which provides a replacement video signal for a bad channel where such replacement video signal may correspond to an adjacent channel or may be an interpolated video signal.

A further advantage would be to provide for video imaging systems a circuit for detection and correction of bad video channels which reduces repair and maintenance procedures.

The foregoing and other advantages and features of the invention are provided in a bad channel detection and correction circuit which includes circuitry responsive to a video signal for providing a difference signal indicative of the difference between a first scan line video signal and a second scan line video signal; a first histogram circuit responsive to the difference signal for generating difference histogram data indicative of the number of occurrences of different values of the difference signal; a second histogram circuit responsive to the first scan line video signal for providing video histogram data indicative of the number of occurrences of different values of the first scan line video signal; means for analyzing the difference histogram data and the video histogram data for providing a decision output indicative of whether the second scan line video signal is from a bad video channel; and output circuitry responsive to the analyzing means for providing a delayed output signal corresponding to (a) the second scan line video signal when the decision output indicates both lines are from good video channels, or (b) a substituted value for the second scan line video signal when the decision output signal indicates that the second scan line video signal is from a bad channel.

BRIEF DESCRIPTION OF THE DRAWING

The advantages and features of the disclosed invention will readily be appreciated by persons skilled in the art from the following detailed description when read in conjunction with the drawing wherein:

FIGS. 6A through 8B are video signal, video difference signal, and histogram plots which are useful in explaining the functions provided by the score-keeping technique of FIG. 5.

DETAILED DESCRIPTION OF THE DISCLOSURE

In the following detailed description and in the several figures of the drawing, like elements are identified with like reference numerals.

Figure 1:
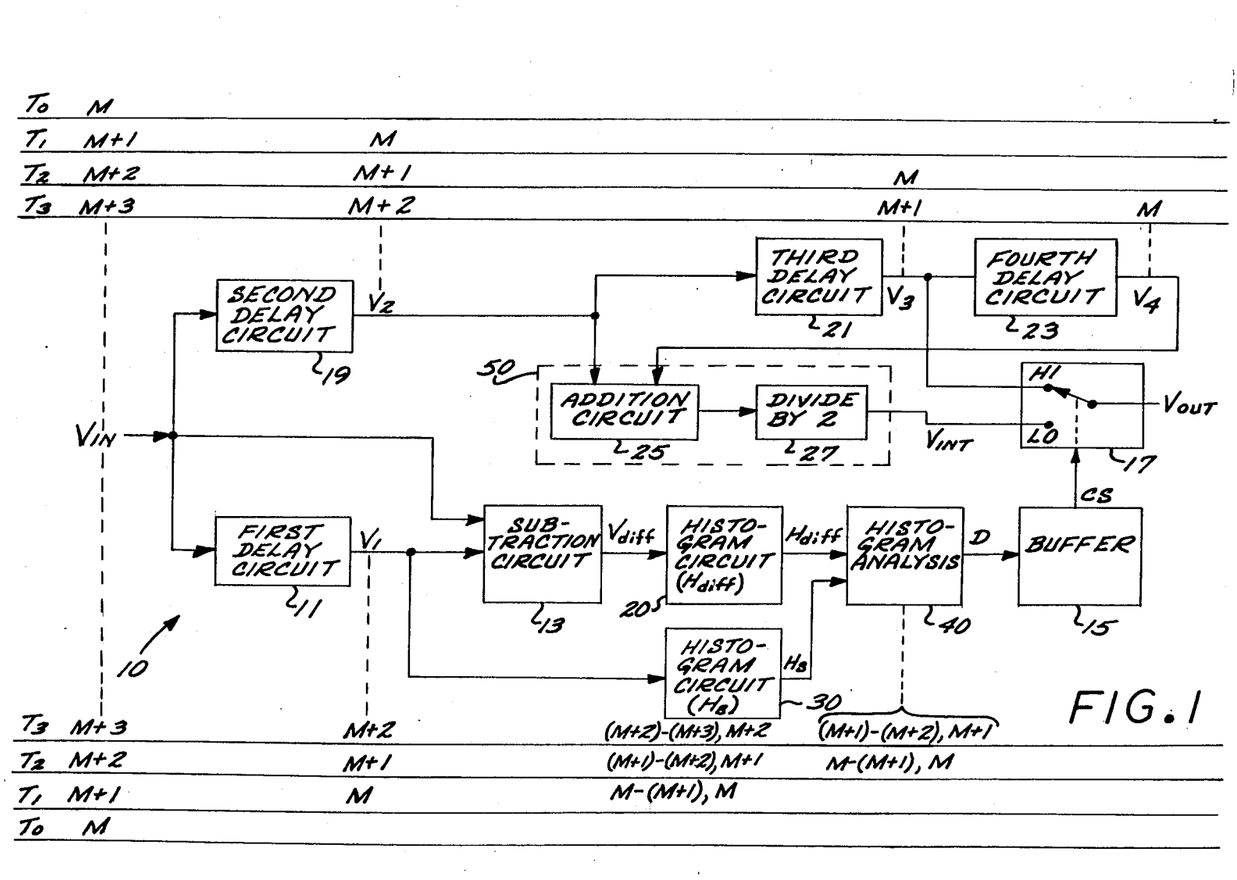
FIG. 1 is a block diagram of the disclosed circuit for detection and correction of bad video channels.

Referring now to FIG. 1, shown therein is a block diagram of a non-invasive bad channel detection and correction circuit 10 which is one embodiment of the video signal processing technique of the invention for detection and correction of bad video channels. The bad channel detection and correction circuit 10 is non-invasive in the sense that its addition to a previously installed AC coupled video imaging system does not require substantial disassembly and/or modification of such installed system. The purpose of the bad channel detection and correction circuit 10 is to detect channels which are bad (i.e., noisy or failed) and to provide corrected video signals for bad channels.

The bad channel detection and correction circuit 10 includes a first delay circuit 11 for accepting a video signal $V_{in}$ which may be provided by the video output amplifier of a video imaging system (not shown). The delay circuit 11 provides as an output a first delayed video signal $V_1$ which is delayed by the time interval for one video scan line. By way of example, the video signal $V_{in}$ may be a serial digital signal wherein each digital value indicates the intensity of a particular pixel or may be an analog signal. The generation and clocking of digital video signals is well known in the art and will not be discussed with any particularity. Similarly, the generation and processing of analog video signals is also well known.

The first delayed video signal $V_1$ is provided as an input to a substraction circuit 13 which also accepts the video signal $V_{in}$ as another input. The subtraction circuit 13 subtracts the first delayed video signal $V_1$ from the video signal $V_{in}$ to provide a video difference signal $V_{diff}$.

The video difference signal $V_{diff}$ is provided to a histogram circuit 20 which determines and stores histogram data $H_{diff}$ of the video difference signal $V_{diff}$ between the video signals for two adjacent video scan lines. Particularly, the histogram circuit 20 maintains respective running totals of the number of occurrence of different values of the video difference signal $V_{diff}$.

The first delayed video signal $V_1$ is also provided to another histogram circuit 30 which determines and stores histogram data $H_s$ of the video signal for the video scan line provided by the first delayed video signal $V_1$. Particularly, the histogram circuit 30 maintains respective running totals of the number of occurrences of different values of the video signals for the video scan line provided by the first delayed video signal $V_1$.

The respective histogram data $H_{diff}$, $H_s$ provided by the histogram circuits 20, 30 are analyzed by a histogram analysis circuit 40 which provides a logic level decision output D indicative of whether the video signal for one of the two adjacent video scan lines is from a bad channel. For ease of reference, the video scan line having video signals that are determined to have been from a bad channel may be called a bad line. Similarly, the video scan line having video signals from a good channel may be called a good line.

The decision output D of the histogram analysis circuit 40 is provided to a latching buffer 15 which provides a control signal CS for controlling a switch circuit 17. The switch circuit 17 includes inputs A and B, a control input C for accepting the control signal CS, and an output D for providing the video output signal $V_{out}$ of the bad channel detection and correction circuit 10. As discussed more fully herein, the video output signal $V_{out}$ corresponds to the video signal $V_{in}$ for a good channel or to a corrected (or compensated) video signal for a bad channel. The video signal from a bad channel may be considered as being compensated in the sense that the video signal for such bad channel is replaced with another video signal.

By way of example and for ease of reference, the decision output D of the histogram analysis circuit 40 is low if the histogram analysis circuit 40 determines that one of the two adjacent lines is bad. Otherwise the decision output D is high. The latching buffer 15 may be a clocked flip-flop or data latch which is appropriately clocked so that it can change state only prior to provision of the beginning of a new video scan line at the output of the switch circuit 17. Particularly, a high control signal CS causes the switch circuit 17 to couple its A input to its output; and a low control signal CS causes the switch circuit 17 to couple its B input to its output.

The video signal $V_{in}$ is further provided to a second delay circuit 19 which provides as an output a second delayed signal $V_2$. The second delay circuit 19 provides a delay equal to the time interval for one video scan line. As discussed more fully herein, a further delay may also be provided as required to allow the histogram analysis circuit 30 to process the histogram for two adjacent lines. Thus, the second delayed video signal $V_2$ may be slightly delayed relative to the first delayed video signal $V_1$.

The second delayed signal $V_2$ is provided to a third delay circuit 21 which provides as an output a third delayed signal $V_3$ that is delayed by the time interval for one video scan line. The third delayed signal $V_3$ is provided to a fourth delay circuit 23 which provides as an output a fourth delayed signal $V_4$ that is delayed by the time interval for one video scan line.

Thus, the outputs of the second delay circuit 19, the third delay circuit 21, and the fourth delay circuit 23 are the video signals for three adjacent video scan lines which are provided in parallel. The video signals for three adjacent video scan lines are made simultaneously available so that appropriate interpolation or substitution may be accomplished to correct the video signals for a bad channel.

For reference, the fourth delayed video signal $V_4$ may be considered line M, and therefore the third delayed video signal $V_3$ may be considered line $M+1$. Similarly, the second delayed video signal $V_2$ corresponds to line $M+2$, and the video signal $V_{in}$ corresponds to line $M+3$. Further, for ease of reference, the first delayed video signal $V_1$ provided by the first delay circuit 11 may also be considered line $M+2$ although it may be slightly ahead of the line $M+2$ provided by the second delay circuit 19 which, as mentioned above, may provide a delay which is more than the time interval for one scan line.

The second delayed video signal $V_2$ provided by the second delay circuit 19 is provided as an input to an addition circuit 25. The fourth delayed video signal $V_4$ provided by the fourth delay circuit 23 is also provided as an input to the addition circuit 25. The addition circuit 25 adds the second delayed video signal $V_2$ and the fourth delayed video signal $V_4$ to provide a summed video signal.

The summed video signal output of the addition circuit 25 is provided to a divide by 2 circuit 27 which divides the summed video signal by 2. It should therefore be readily understood that the addition circuit 25 and the divide by 2 circuit 27 function as an interpolator 50 which provides an interpolated video signal $V_{int}$ as the output of the divide by two circuit 27. The interpolated video signal $V_{int}$ may be substituted for the video signal for the line $M+1$ (provided by the third delay circuit 21), in the event the line $M+1$ is determined by the histogram analysis circuit 40 to be the output of a bad channel.

The interpolated video signal $V_{int}$ is provided to the A input of the switch circuit 17 which also accepts the third delayed video signal $V_3$ at its B input. As discussed previously, the switch circuit 17 couples its A input to its output pursuant to a high control signal CS from the latching buffer 15, and couples its B input to its output pursuant to a low control signal CS.

For the prior example where the histogram analysis circuit 40 provides a high decision output D if the adjacent lines are both from good channels, the switch circuit 17 provides the third delayed video signal $V_3$ as its video output signal $V_{out}$ when the decision output D is high. If the histogram analysis circuit 40 provides a low decision output D, the switch circuit 17 provides the interpolated video signal $V_{int}$ as its video output signal $V_{out}$.

It should be readily appreciated that the interpolator 50 could be eliminated, and the output of the fourth delay circuit 23 could be coupled directly to the B input of the switch circuit 17. In such case, the video signal for the line M would be substituted for the line M+1 if the histogram analysis circuit 40 provides a low decision output D.

Figure 2:
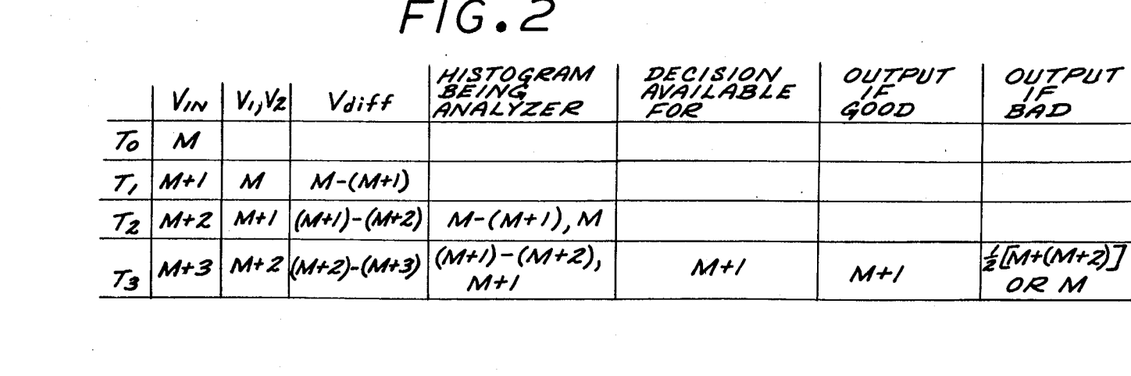
FIG. 2 is a State Diagram which is useful in understanding the bad video channel detection and correction circuit of FIG. 1.

The overall operation of the bad channel detection and correction circuit 10 can perhaps be best understood by discussing with reference to the State Diagram of FIG. 2 the sequence of operations by which the video signal for the line M+1 is input, analyzed, and corrected or compensated to the extent necessary.

In the State Diagram of FIG. 2, each of the time intervals $T_0$ through $T_3$ represents the time interval period for one video scan line, during which the video signal for a particular video scan line is being provided by the video signal $V_{in}$. For each such video scan line time interval, the video lines that are being processed are identified in the columns which respectively describe the processing operations. Particularly, the lines are identified solely by line number (e.g., M) without the word "line." For this discussion, the line M (first in time) and the line M+2 (third in time) are assumed to be the outputs of good channels.

For ease of reference, FIG. 1 also includes references to the time intervals $T_0$ through $T_3$ and related references to the lines M through M+3. Particularly, the time and line number references are included to show the presence of the video signals for the different lines as they are provided by the video signals $V_{in}$, $V_1$, $V_2$, $V_3$, and $V_4$ during the time intervals $T_0$ through $T_3$.

During the time period $T_0$, the video signal of the line M is being provided by the video signal $V_{in}$, and line M+1 has not yet occurred.

During the time period $T_1$, the video signal for the line M+1 is being provided as the video signal $V_{in}$; and the video signal for the line M is being provided by the first delay circuit 11 as the first delayed video signal $V_1$ and by the second delay circuit 19 as the second delayed video signal $V_2$. Further, the histogram data $H_{diff}$ based on the difference signal $V_{diff}$ between the line M and the line M+1 is being calculated by the histogram circuit 20; and histogram data $H_s$ for the video signal for the line M is being calculated by the histogram circuit 30.

During the time interval $T_2$, the video signal for the line M+2 is being provided by the video signal $V_{in}$; and the video signal for the line M+1 is being provided by the first delay circuit 11 as the first delayed video signal $V_1$ and by the second delay circuit 19 as the second delayed video signal $V_2$. Further, the histogram data $H_{diff}$ for the difference signal $V_{diff}$ between the line M and the line M+1 and the histogram data $H_s$ of the video signal for the line M are read and then analyzed by the histogram analysis circuit 40. Preferably, the histogram analysis is completed prior to the end of the time interval for one video scan line. Also during the time interval $T_2$, the histogram data $H_{diff}$ for the difference signal $V_{diff}$ between the line M+1 and the line M+2 is being calculated by the histogram circuit 20, and the histogram data $H_s$ for the line M+1 is being determined by the histogram circuit 30.

Pursuant to the analysis of the histogram data for the lines M and M+1, the decision output D of the histogram analysis circuit 40 is based on whether the histogram data $H_{diff}$, $H_s$ are indicative of (a) both lines are good, or (b) the line M+1 is provided by a bad channel. The decision output D for the line M+1 is then stored in the latching buffer 15 after the video signal for the line M has been provided as the video output signal $V_{out}$ so that the switch circuit 17 will be appropriately set to provide the appropriate video out signal $V_{out}$ for the line M+1.

During the time interval $T_3$, the video signal for the line M+2 is provided by the first delay circuit 11 as the first delayed video signal $V_1$ and by the second delay circuit 19 as the second delayed video signal $V_2$. The video signal for the line M+1 is provided by the third delay circuit 21 as the third delayed video signal $V_3$, and the video signal for the line M is provided by the fourth delay circuit 23 as the fourth delayed video signal $V_4$.

Further during the time period $T_3$, the video signal for the line M+1 is provided by the video output signal $V_{out}$. The video signal for the line M+1 as provided by the video output signal $V_{out}$ corresponds to either the third delayed video signal $V_3$ from the third delay circuit 21 or the interpolated signal $V_{int}$ based on the outputs from the second delay circuit 19 and the fourth delay circuit 23. Alternatively, the video signal for the line M as provided by the fourth delayed video signal $V_4$ from the fourth delay circuit 23 may be provided by the video output singal $V_{out}$ as the video signal for the line M+1. Also, the histogram data $H_{diff}$ for the difference between the respective video signals for the line M+2 and the line M+1, and the histogram data $H_s$ for the line M+1 are being analyzed by the histogram analysis circuit 40. The histogram data $H_{diff}$ for the difference between the lines M+3 and M+2 and the histogram data $H_s$ for the line M+2 are being respectively calculated by the histogram circuits 20, 30.

It should be understood that if the video signal for the line M+1 is determined to be from a bad channel, then the histogram data based on the lines M+2 and M+1 will also indicate a bad channel. Therefore, the decision output of the histogram analysis circuit 40 is controlled to correspond to a good channel determination for the line subsequent to a bad channel determination. Otherwise, an interpolated video signal based on a bad channel (for the line M+1) would replace what probably is a video signal from a good channel (for the line M+2).

Additional logic to determine if the video signals for two adjacent lines are the result of bad channels is believed to be unwarranted for the following reasons. The probability of two adjacent channels being bad is believed to be rare, and providing additional circuitry for such a rare occurrence may not be cost effective. When required, such logic can be added and would include inter alia additional delay circuits.

In the foregoing disclosed bad channel detection and correction circuit 10, the video signals for the line M and the line M+2 are assumed to have been provided by good channels. That assumption is appropriate since the possibility of having two adjacent bad channels is quite unlikely, as mentioned above.

It should readily be evident that a special situation is presented for processing the first line of a field. Since there is no appropriate video scan line prior to the first scan line, such first scan line is not processed by the subtraction circuit 13 and subsequent circuitry. Thus, for a particular field, calculation of histogram data begins when the video signal $V_{in}$ provides the video signal for the second video scan line.

After the video signals for a field have been provided by the video out signal $V_{out}$, further processing may be utilized, for example to improve the displayed image. Examples of further processing of video signals are set forth in U.S. Pat. Nos. 4,318,129, issued to R. Zwirn on Mar. 2, 1982, and assigned to the assignee of the subject invention; and in 4,445,138, issued to R. Zwirn, et al., on Apr. 24, 1984, and assigned to the assignee of the subject invention.

Figure 3:
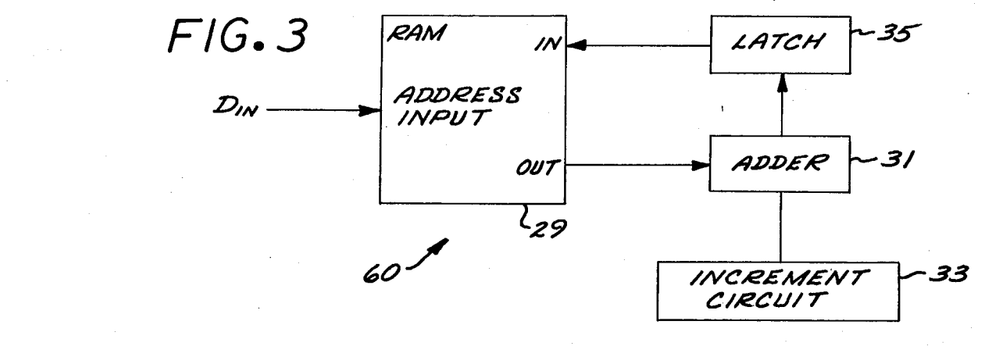
FIG. 3 is a schematic diagram of a histogram circuit utilized in the bad video channel detection and correction circuit of FIG. 1

Referring now to FIG. 3, shown therein by way of example is block diagram of a histogram circuit 60 which may be utilized as the histogram circuit 20 and as the histogram circuit 30. The histogram circuit 60 accepts a digital input signal $D_{in}$ which corresponds to the video difference signal $V_{diff}$ or the first delayed video signal $V_1$, as appropriate. Such digital input signal $D_{in}$ may be provided by having a digital video signal $V_{in}$ so that the subtraction circuit 13 provides a pixel-by-pixel sequence of values of the video difference signal $V_{diff}$, and the first delay circuit provides a pixel-by-pixel sequence of values of the first delayed video signal $V_1$.

The digital input signal $D_{in}$ is provided to the address input of a random access memory (RAM) 29. Each time a value of the digital input signal $D_{in}$ is provided at the address input of the RAM 29, the contents of the memory location corresponding to that particular address is read into an adder 31. The contents of the adder 31 are then incremented by one by an increment circuit 33. The incremented result is buffered in a latch circuit 35 and written back into the RAM 29 at the same address from which it had been read out prior to incrementing.

Thus, the histogram is based on respective memory addresses which correspond to particular values of the digital input signal $D_{in}$ provided to the address input of the RAM 29. The number of occurrences of a particular value of the digital input signal $D_{in}$ is represented by the contents of the memory location corresponding to the particular value.

By way of example, for the histogram circuit 30, which provides the histogram data $H_{diff}$ for the difference between the video signals for adjacent video scan lines, a range of addresses from 0 through 255 may be utilized for use with a range of video difference signal values from $-128$ through 127. With such range of addresses, the values of the video difference signal $V_{diff}$ would be increased by 128 to correspond to the range of addresses. In subsequent processing, the address corresponding to a particular value of the video difference signal $V_{diff}$ would be reduced by 128 to obtain the actual video difference signal value.

Further by way of example, for the histogram circuit 40, which provides the histogram $H_s$ for the first delayed video signal $V_1$, a range of addresses from 0 through 255 may be utilized for use with a range of video signal values from 0 through 255.

For ease of reference, histogram data may be considered as respective ordered pairs which may be represented as (A,B), where A is a particular value of the difference signal $V_{diff}$ or the first delayed video signal $V_1$, and B is the histogram value identifying the number of occurrences of that signal value. Thus, for example, the histogram data $H_{diff}$ based on the difference between the video signals for adjacent video lines may be graphically represented with two dimensional Cartesian coordinates where the horizontal axis (or X-axis) represents the values of the difference signal $V_{diff}$ and the vertical axis (or Y-axis) represents the histogram values.

Figure 4:
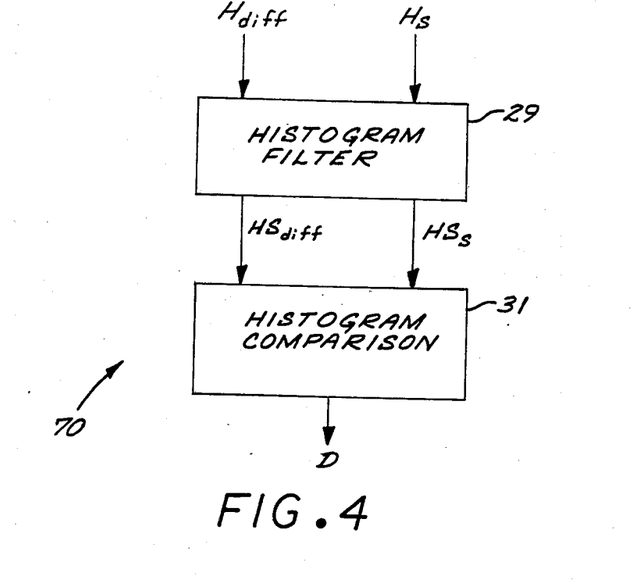
FIG. 4 is a block diagram of the program modules of the histogram analysis circuit of the bad video channel detection and correction circuit of FIG. 1.

Referring now to FIG. 4, shown therein is a block diagram of the program function modules 70 for the histogram analysis circuit 30, which may be implemented with appropriate microprocessor programs. A histogram filter module 29 smooths the respective histogram data $H_{diff}$, $H_s$ from the histogram circuits 20, 30 to provide corresponding smoothed histogram data $HS_{diff}$, $HS_s$. The smoothed histogram data $HS_{diff}$, $HS_s$ is processed by a histogram comparison program module 31.

By way of example, the filter module 29 may provide smoothed histogram data wherein each smoothed histogram value (number of occurrences) is the sum of the corresponding non-smoothed histogram value and the two non-smoothed histogram values on either side. Thus, each smoothed histogram value is the sum of the five adjacent non-smoothed histogram values. With such a filtering process, the smoothed histogram data will have four values less than the non-smoothed histogram data since the first two values and the last two values of the non-smoothed histogram data do not have corresponding smoothed data.

The histogram comparison module 31 analyzes the characteristics of the smoothed histogram data $HS_{diff}$, $HS_s$ to determine whether the smoothed histogram data $HS_{diff}$ based on two adjacent video scan lines is similar to the first of the adjacent video scan lines, which is assumed to be from a good channel. If the smoothed histogram data $HS_{diff}$ and the smoothed histogram data $HS_s$ are similar, then the second of the adjacent lines is determined to have been provided by a bad channel; and the decision output D of the histogram analysis circuit is low. Otherwise, the decision output D is high.

The foregoing histogram comparison is further illustrated with reference to the flowchart of FIG. 5, the signal plots and histograms of FIGS. 6A through 8B, and the Tables I through IV of FIGS. 9 through 12. The flowchart of FIG. 5 generally illustrates a a score-keeping technique for comparing the characteristics of the respective smoothed histogram data $HS_{diff}$, $HS_s$. Briefly, the score-keeping comparison technique assigns scores that are functions of similarities between the characteristics of the histograms being compared. A higher score indicates greater similarity.

Figures 6A, 6B:
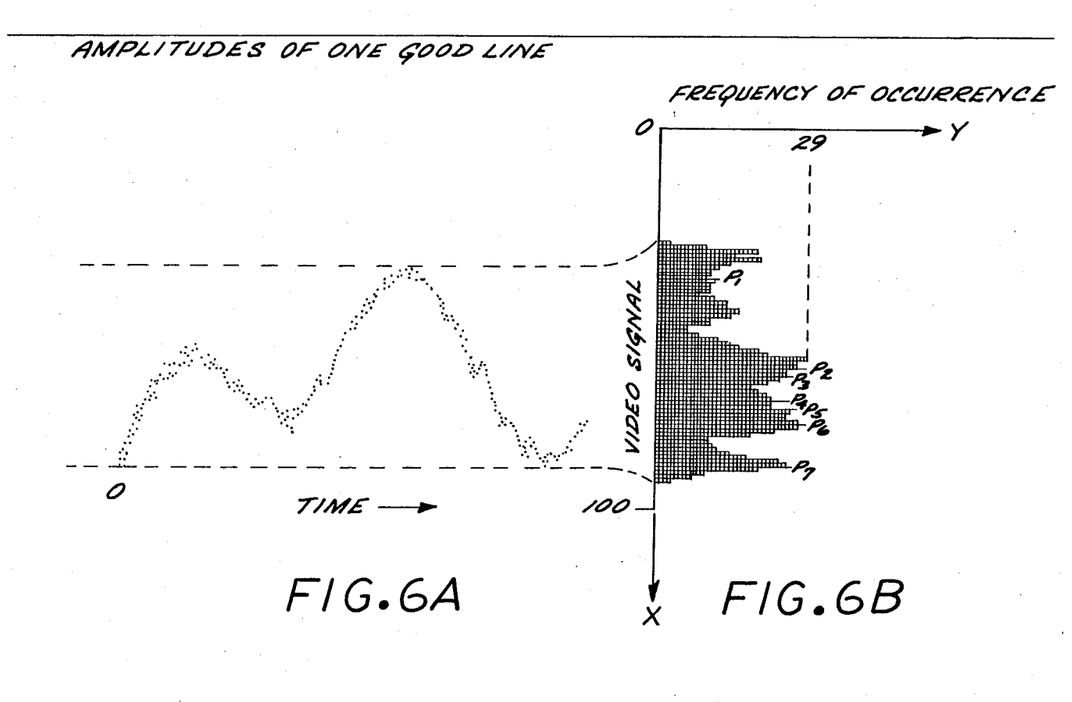

FIG. 6A is a video signal plot of a good video line; and FIG. 6B is the video histogram of the good line video signal of FIG. 6A. In order to more graphically illustrate the distribution of the values of the video signal of FIG. 6A, the video histogram of FIG. 6B has been rotated 90 degrees in the clockwise direction and placed adjacent FIG. 6A. Thus, the vertical axis represents the video signal values and is shown as the X-axis; and the horizontal axis represents the histogram values (number of occurrences) and is shown as the Y-axis.

Figure 7A:
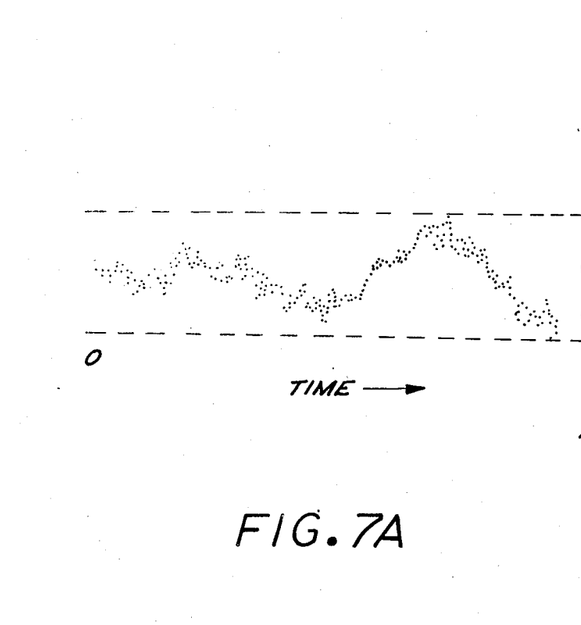
Figure 7B:
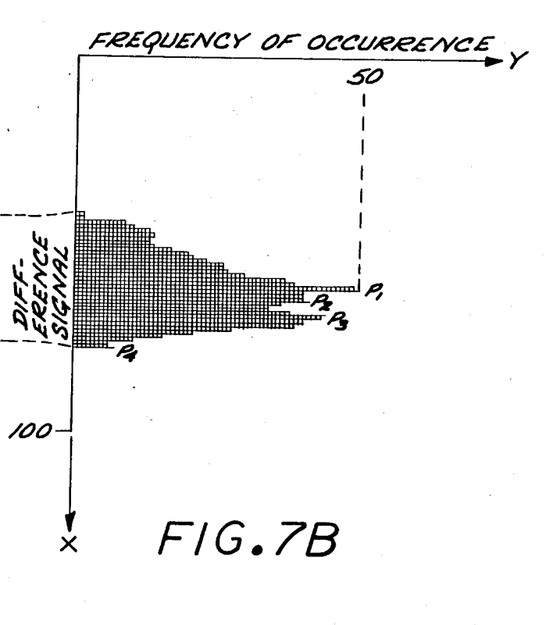

FIG. 7A is a plot of the video difference signal between the good line video signal of FIG. 6A and the video signal for another good line. FIG. 7B is the difference histogram of the video difference signal plot of FIG. 7B, and also has been rotated 90 degrees in the clockwise direction and placed adjacent FIG. 7A to more graphically illustrate the distribution of the values of the video difference signal of FIG. 7A.

Figure 8A:
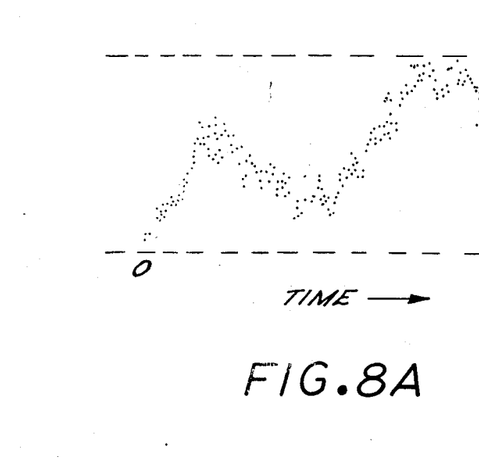
Figure 8B:
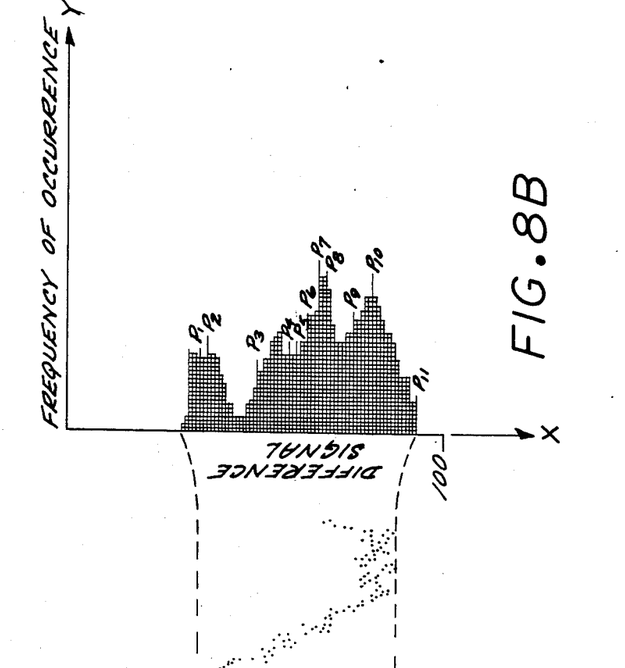

FIG. 8A is a plot of the video difference signal between the good line video signal of FIG. 6A and the video signal for a bad line. FIG. 8B is the difference histogram of the video difference signal plot of FIG. 8A, and also has been rotated 90 degrees in the clockwise direction and placed adjacent FIG. 8A to more graphically illustrate the distribution of values of the video difference signal of FIG. 8A.

Figure 9:
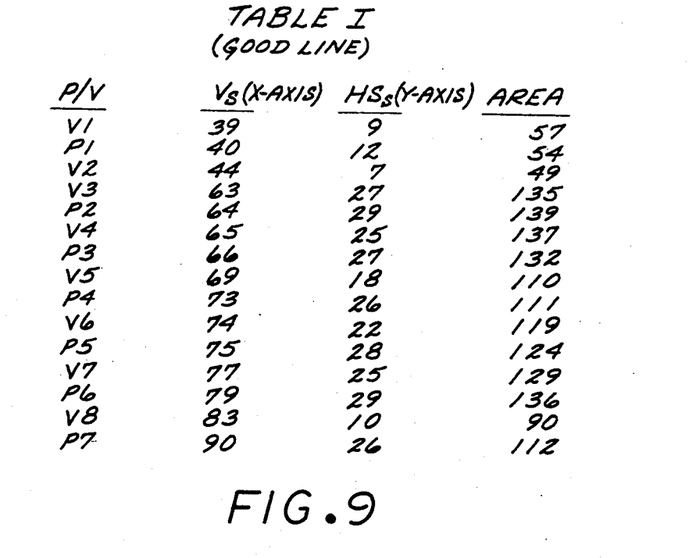
FIGS. 9 through 12 are tables of characteristics of the histogram plots of FIGS. 6B, 7B, and 8B which are useful in explaining the functions provided by the score-keeping technique of FIG. 5.

Table I of FIG. 9 sets forth histogram characteristics of the video histogram of FIG. 6B for the good line video signal of FIG. 6A. Table II of FIG. 10 sets forth histogram characteristics of the difference histogram for the video difference signal of FIG. 7A between the good line video signal of FIG. 6A and the video signal of an adjacent second good line. Table III of FIG. 11 sets forth histogram characteristics of the difference histogram for the video difference signal between the good line video signal of FIG. 6A and the video signal for an adjacent second bad line. Table IV of FIG. 12 sets forth the results of the score-keeping comparison technique of FIG. 5 as applied to the histogram characteristics set forth in Tables I through III.

In each of the Tables I through III, the first column (P/V) identifies the peaks (P) and valleys (V) of the associated histogram. The second column ($V_{diff}$ or $V_s$) identifies the video difference signal or video signal values (i.e., locations) associated with the peaks or valleys. The third column ($HS_{diff}$ or $HS_s$) provides the histogram values (i.e., number of occurrences) of the signal values associated with the peaks or valleys. For the RAM based histogram circuit of FIG. 3, the video difference signal or video signal values may correspond to addresses in a random access memory included in the histogram analysis circuit 40 for storing the smoothed histogram data $HS_{diff}$, $HS_s$. The fourth column (Area) sets forth the respective areas around the peaks and valleys of the histograms.

Figure 5:
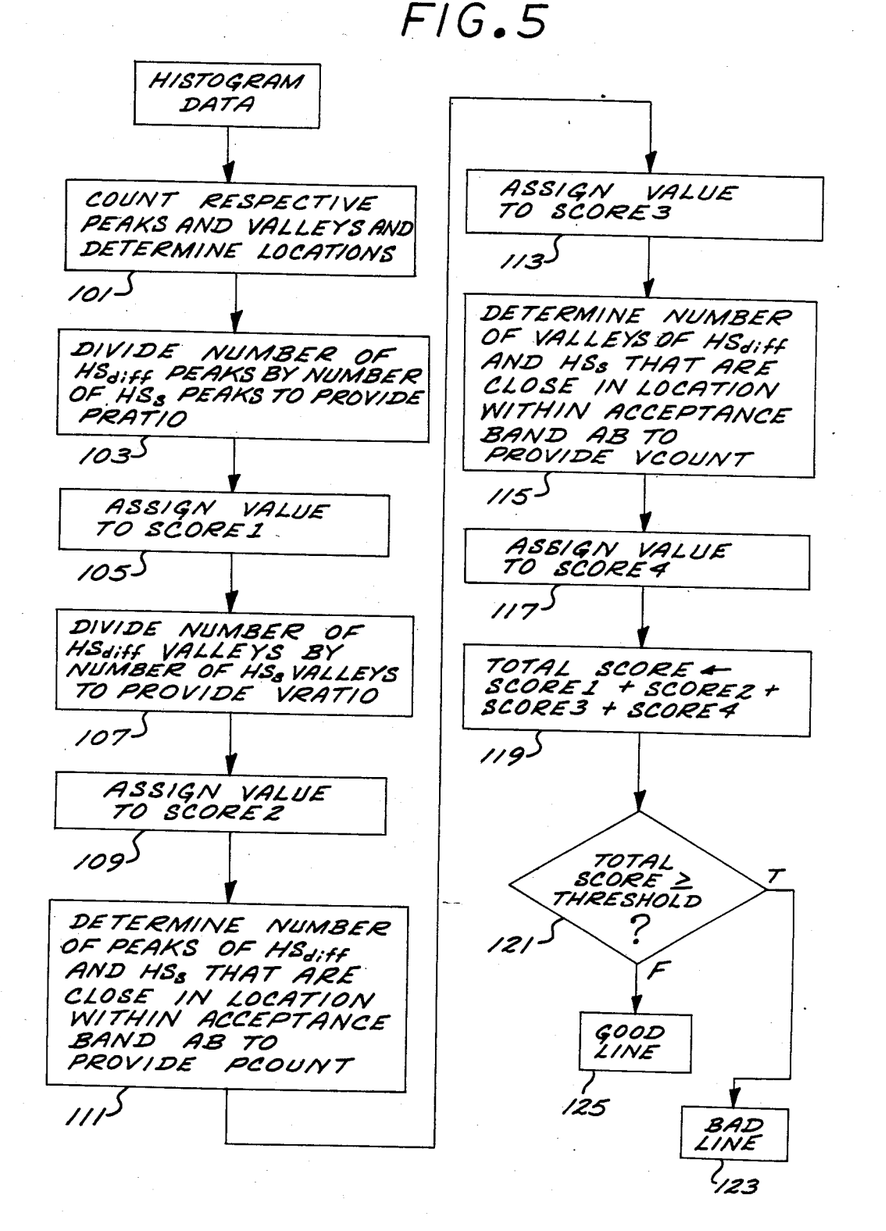
FIG. 5 is a flowchart of a score-keeping technique which may be utilized by the histogram analysis circuit of the bad video channel detection and correction circuit of FIG. 1.

Referring now to FIG. 5, the score-keeping comparison technique includes counting the respective peaks and valleys and respective locations for the smoothed histogram data $HS_{diff}$, $HS_s$ being compared, as identified by the function block 101. The number of $HS_{diff}$ peaks is then divided by the number of $HS_s$ peaks to provide the peaks ratio PRATIO, as shown by the function block 103. The PRATIO result is utilized to assign a value to SCORE1, as indicated by the function block 105.

Pursuant to the next function block 107, the number of $HS_{diff}$ valleys is divided by the number of $HS_s$ valleys to provide the valleys ratio VRATIO. The VRATIO result is utilized to assign a value to SCORE2, as shown by the function block 109.

Next, as indicated by the function block 111, the comparison technique determines the number of peaks of $HS_{diff}$ and peaks of $HS_s$ that are close in location within an acceptance band AB. The resulting tally PCOUNT is utilized to assign a value to SCORE3, as shown by the function block 113.

Pursuant to the function block 115, the comparison technique determines the number of valleys of $HS_{diff}$ and valleys of $HS_s$ that are close in location within the acceptance band AB. The resulting tally VCOUNT is utilized to assign a value to SCORE4, as shown by the function block 117.

The scores SCORE1 through SCORE4 are summed to provide the TOTAL SCORE, as indicated with the function block 119. A decision is then made pursuant to a decision block 121 to determine whether the TOTAL SCORE is greater than or equal to a predetermined threshold. If the result of the decision is True, then the second line is a bad line from a bad channel, as indicated by the block 123. If the result of the decision is False, then the second line is a good line from a good channel, as indicated by the block 125.

On the basis of the result of the decision at 121, the histogram analysis circuit 40 provides a low (bad line) or high (good line) decision output D. It should be readily understood that the higher the TOTAL SCORE, the greater the similarity between the histograms $HS_{diff}$, $HS_s$ being compared.

By way of example, the value assigned to SCORE1 may be zero, or one of the weighting factors A1, A2, A3, depending on the peaks ratio PRATIO calculated pursuant to the function block 103, and where:

$$A1 > A2 > A3 \qquad \text{(Equation 1)}$$

Particularly, SCORE1 is initially assigned a value of zero and may then be assigned another value as follows:

$$SCORE1 = A1, \text{ for } 1 < PRATIO < 1.1 \qquad \text{(Equation 2)}$$

$$SCORE1 = A2, \text{ for } 1 < PRATIO < 1.33 \qquad \text{(Equation 3)}$$

$$SCORE1 = A3, \text{ for } 1 < PRATIO < 2 \qquad \text{(Equation 4)}$$

Similarly, the value assigned to SCORE2 may also be zero or one of the weighting factors A1, A2, A3, depending on the number of valleys ratio VRATIO calculated pursuant to the function block 107. Particularly, the same limits as defined for SCORE1 in Equations 1 through 4 may also be utilized for SCORE2.

The acceptance band AB utilized for determining the respective number of corresponding peaks and valleys may defined as the integer ratio of the largest value of video difference signal $V_{diff}$ or the video signal $V_s$ (i.e., location) divided by the total number of histogram peaks and valleys for both histograms being compared.

The value assigned to SCORE3 may be the number of corresponding peaks PCOUNT determined pursuant to the function block 111 multiplied by a weighting factor B1. Similarly, the value assigned to SCORE4 may be the number of corresponding valleys VCOUNT determined pursuant to the function block 115 multiplied by a weighting factor C1.

Referring now to the Table IV of FIG. 9, shown therein are the results of the foregoing score-keeping comparison technique as applied to the histogram characteristics set forth in the Tables I through III of FIGS. 6 though 8. The GOOD LINE column sets forth the numbers of peaks and valleys for the good line whose histogram characteristics are set forth in Table I, and also sets forth the locations of the peaks and valleys of the histogram of such good line that are close in location to the peaks and valleys of the histograms whose characteristics are set forth in Tables II and III.

Figure 12:
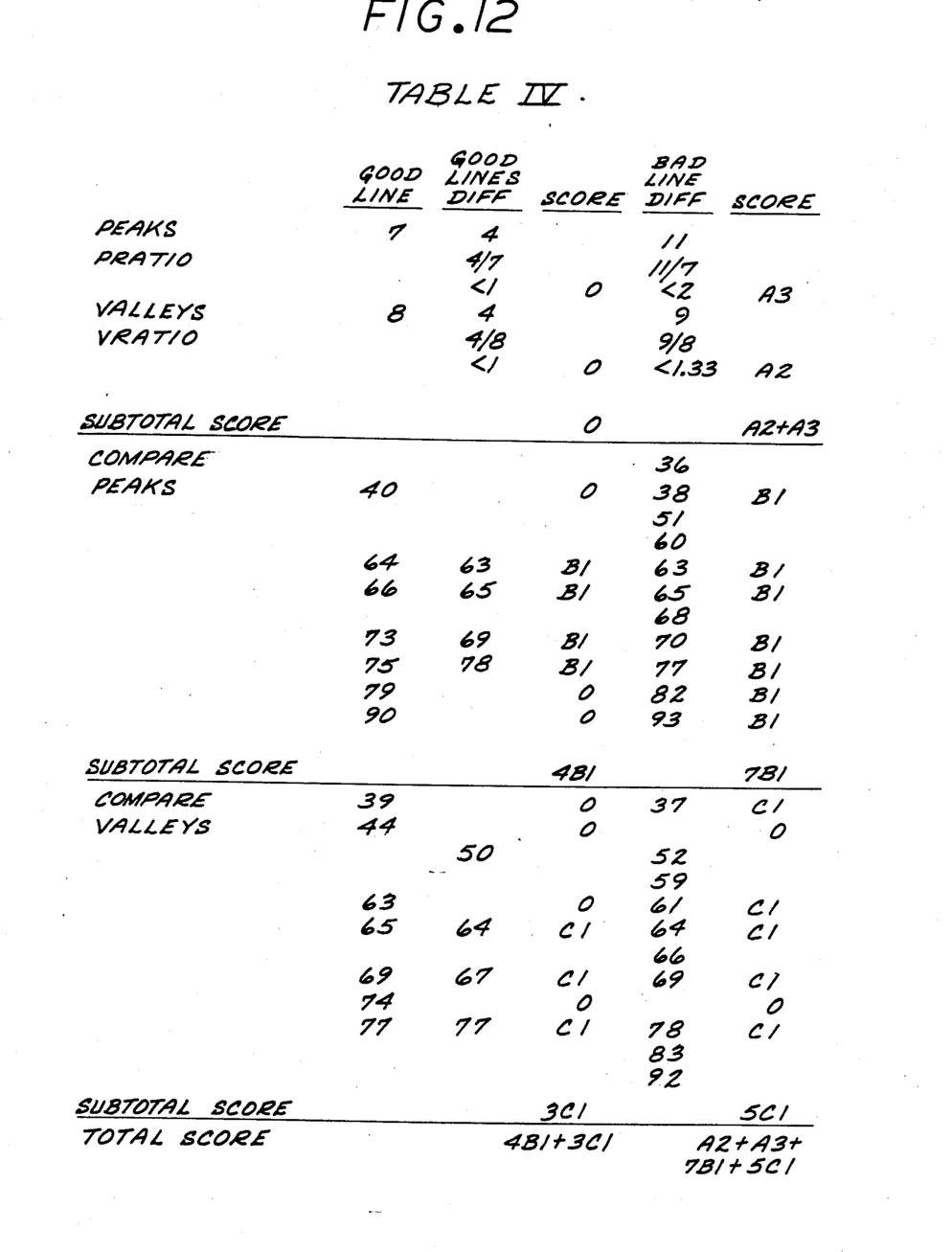

The GOOD LINES DIFF column sets forth the numbers of peaks and valleys for the histogram of differences between the good line whose histogram characteristics are set forth in Table I and another good line. Also set forth are the locations of the peaks and valleys of such histogram of differences that are close in location to the peaks and valleys of the histograms whose characteristics are set forth in Table I or Table II. The GOOD LINES DIFF column also sets forth the peaks ratio PRATIO and the valleys ratio VRATIO between the histogram of the good line whose histogram characteristics are set forth in Table I and the histogram of the differences between such good line and another good line.

The first SCORE column sets forth the resulting scores of the comparison between (a) the characteristics in Table I of the histogram for a good line and (b) the characteristics of histogram for the differences between the good line whose histogram characteristics are set forth in Table I and another good line, which characteristics are set forth in Table II.

The BAD LINE DIFF column sets forth the numbers of peaks and valleys for the histogram of differences between the good line whose characteristics are set forth in Table I and a bad line. Also set forth are the locations of the peaks and valleys of such histogram of differences that are close in location to the peaks and valleys of the histograms whose characteristics are set forth in Table I or Table III. The BAD LINE DIFF column also sets forth the peaks ratio PRATIO and the valleys ratio VRATIO between the histogram for a good line whose characteristics are set forth in Table I and the histogram of the differences between such good line and a bad line.

The second SCORE column sets forth the resulting scores of the comparison between (a) the characteristics of the histogram for a good line whose characteristics are set forth in Table I and (b) the histogram for the differences between the good line whose characteristics are set forth in Table I and a bad line which characteristics are set forth in Table III.

As shown by the respective TOTAL SCOREs, comparison of the characteristics of the histogram for a good line with the characteristics of the histogram for the difference between such good line and another good line provides a lower score than the comparison of the characteristics of the histogram for a good line with the characteristics of the histogram for the differences between such good line and a bad line.

It should be understood that the actual values assigned to the weighted factors A1, A2, A3, B1, B2 will depend upon the relative significance of the different characteristics on the determination of whether the histograms being compared are similar.

While the foregoing histogram analysis has been directed to the use of two histogram data $H_{diff}$, $H_s$, the histogram data $H_{diff}$ which is based on the differences between the video signals for adjacent lines may be utilized alone. With such implementation, the second histogram circuit 30 would not be required.

Figure 10:
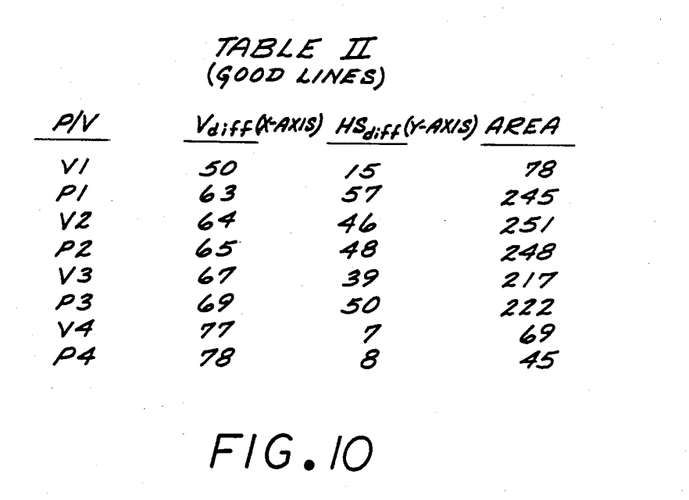
Figure 11:
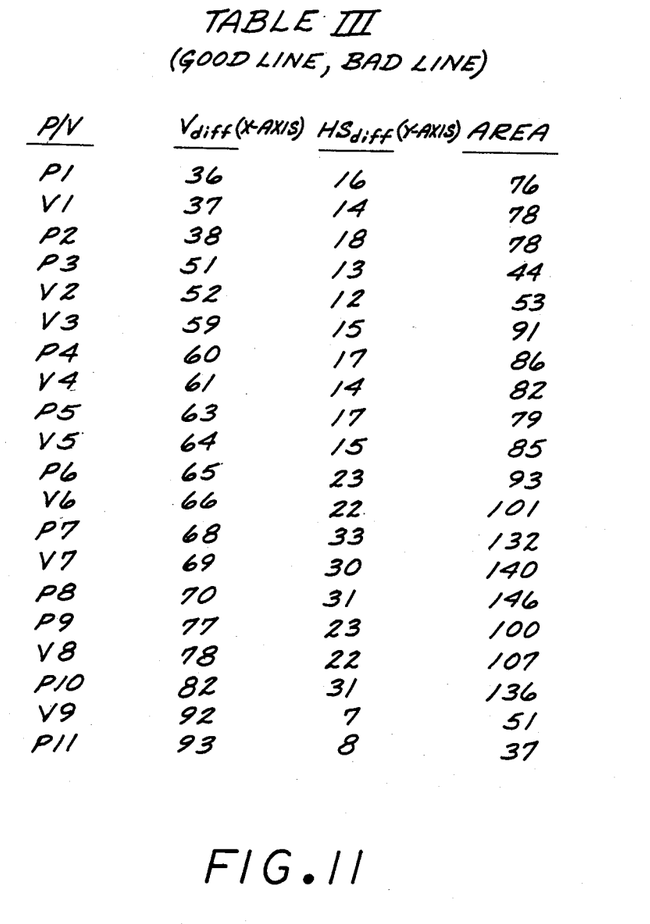

The histogram analysis based on only the histogram $H_{diff}$ may be implemented as follows. The histogram $H_{diff}$ is smoothed, as described above, to provide a smoothed histograms $HS_{diff}$. Then the peaks of the histogram (as set forth in Tables II and III) are averaged to provide a peak average. Also, the areas around the peaks (as set forth in Tables II and III) are averaged to provide an area average.

The peak average is then compared with a peak threshold, and if the peak average is less than the threshold, a peak score is assigned a non-zero positive value. Otherwise the peak score is zero. The area average is also compared with an area threshold and if the area average is less than the area threshold, an area score is assigned a non-zero positive value. Otherwise the area score is zero.

The peak score and the area score are summed to provide a total score which is compared with a threshold value. If the total score is greater than the threshold, then the video signal for the second of the two adjacent lines is determined to have been provided by a bad channel and the decision output D of the histogram analysis circuit 40 is low. Otherwise, the video signals for both video lines are determined to have been provided by good channels and the decision output D of the histogram analysis circuit 40 is high.

By way of example, the positive value that may be assigned to the peak score may be 1, and the positive value that may be assigned to the area score may also be 1. The threshold against which the total score is compared may be 0 or 1.

As still another alternative, to the extent that the hardware for providing histogram data for adjacent lines may not be available or may not be readily utilized in particular applications, then the histogram of a line, such as provided by the histogram circuit 30, provides adequate information for analysis by the histogram analysis circuit 40. With such implementation, the first and second delay circuits 11, 19, the subtraction circuit 13, and the histogram circuit 20 would not be utilized.

For example, if the histogram data shows all video signal values for a line at zero, such video signals probably were provided by a shorted channel. Or such line could be part of a uniform object scene. Further, if the histogram data for a line has a Gaussian distribution, such line is likely to have been provided by a noisy channel. Or such line could be part of an object scene that in fact has a Gaussian-like distribution.

In a manner similar to the previously discussed scorekeeping techniques, the characteristics of a video signal histogram may be evaluated to determine whether the line is good or bad.

It should be readily apparent that the histogram analysis provided by the histogram analysis circuit 40 is generally directed to determining whether histogram data based on video signals has appropriate characteristics that would be of video signals provided by good channels. Thus, when a video difference histogram is used, a determination is made as to whether such difference histogram "looks" like a histogram of the difference between two good lines. The above-described score-keeping techniques are examples for accomplishing such determination for a difference histogram and other techniques may be utilized. Similarly, when a video histogram is used, a determination is made as to whether such video histogram "looks" like a histogram of a good video line.

As to the above-discussed implementations, one utilizes both a difference histogram and video histogram, another utilizes only a difference histogram, while still another utilizes only a video histogram. The use of only a difference histogram provides for a moderate probability of false alarms (i.e., a good line is determined to be a bad line), while the use of only a video histogram may provide for more than a moderate probability of false alarms. However, the penalty for false alarms is minimal since the replacement of a good line with an interpolated or another line provides a line that resembles a good line.

To the extent that the additional hardware and processing capabilities for the two histogram technique may be appropriate for particular applications, then the potential for error is be reduced substantially. Particularly, the two histogram technique effectively utilizes the salient features of using either histogram alone, and reduces possible ambiguities that are present when only one histogram is used.

The foregoing has been a disclosure of a video signal processing technique for detection and correction of bad video channels and provides substantial advantages, including the capability of being readily added to previously installed video imaging systems. Additionally, the disclosed technique maintains the utility of video signals that include signals provided by one or more bad channels. Still further, the disclosed technique reduces repair and maintenance procedures. Moreover, while the disclosed technique provides substantial advantages, it does so with minimal impact of false alarms.

Although the foregoing has been a description and illustration of specific embodiments of the invention, various modifications and changes thereto can be made by persons skilled in the art without departing from the scope and spirit of the invention as defined by the following claims.

What is claimed is:

1. For a video imaging system having a plurality of video channels for providing a video signal for a plurality of scan lines, a bad channel detection and correction circuit comprising:

means responsive to the video signal for providing a difference signal indicative of the difference between a first scan line video signal and a second scan line video signals;

first histogram means responsive to said difference signal for generating difference histogram data indicative of the number of occurrences of different values of said difference signal;

second histogram means responsive to said first scan line video signal for providing video histogram data indicative of the number of occurrences of different values of said first scan line video signal;

means for analyzing said difference histogram data and said video histogram data for providing a decision output indicative of whether said second scan line video signal is from a bad video channel; and output means responsive to said decision output for providing a delayed video output signal corresponding to (a) said second scan line video signal when said decision output indicates both lines are from good video channels, or (b) a substitute video signal for said second scan line video signal when said decision output signal indicates that said second scan line video signal is from a bad channel.

2. The detection and correction circuit of claim 1 wherein said means for providing said difference signal comprises:

first delay means for delaying said first scan line video signal by one scan line relative to said second scan line video signal to provide a delayed first scan line video signal which is synchronized with said second scan line video signal; and means for subtracting said second scan line video signal from said delayed first scan line video signal to provide said difference signal.

3. The detection and correction circuit of claim 1 wherein said analyzing means includes means for comparing respective characteristics of said difference histogram data and said video histogram data, and for determining on the basis of said comparison whether said difference histogram data is similar to said video histogram data.

4. The detection and correction circuit of claim 1 wherein said output means comprises:

delay means responsive to the video signal for providing in parallel delayed versions of said first and second scan line video signals and a third video scan line;

means responsive to said delay means for providing a substitute video signal; and switching means responsive to said decision output of said analyzing means for providing as said delayed video output signal said delayed version of said second scan line video signal or said substitute video signal.

5. The bad channel detection and correction circuit of claim 4 wherein said means for providing said substitute video signal includes means for interpolating said delayed versions of said first scan line video signal and said third scan line video signal to provide an interpolated video as said substitute video signal.

6. The bad channel detection and correction circuit of claim 4 wherein said means for providing said substitute video signal includes means for providing said delayed version of said first scan line video signal as said substitute video signal.

7. The bad channel detection and correction circuit of claim 4 wherein said delay means includes a plurality of serially coupled delay circuits.

8. For a video imaging system having a plurality of video channels for providing a video signal for a plurality of scan lines, a bad channel detection and correction circuit comprising:

means responsive to the video signal for providing histogram data based on the video signals for one or more video scan lines;

means for analyzing said histogram data for providing a decision output indicative of whether the video signal for a particular video scan line is from a bad video channel; and output means responsive to said decision output for providing a delayed video output signal corresponding to (a) the video signal for said particular video scan line when said decision output indicates that said particular video scan line is from a good video channel, or (b) a substitute video signal for said particular scan line video signal when said decision output signal indicates that said particular scan line video signal is from a bad channel.

9. The bad channel detection and correction circuit of claim 8 wherein said means for providing histogram data includes means for providing difference histogram data for the difference between a first scan line video signal and a second scan line video signal.

10. The bad channel detection and correction circuit of claim 9 wherein said analyzing means includes means for determining whether said difference histogram data has characteristics indicative of whether said first and second scan line video signals were provided by good video channels.

11. The bad channel detection and correction circuit of claim 10 wherein said output means comprises:

delay means responsive to the video signal for providing in parallel delayed versions of said first and second scan line video signals and a third video scan line;

means responsive to said delay means for providing a substitute video signal; and switching means responsive to said decision output of said analyzing means for providing as said delayed video output signal said delayed version of said second scan line video signal or said substitute video signal.

12. The bad channel detection and correction circuit of claim 11 wherein said means for providing said substitute video signal includes means for interpolating said delayed versions of said first scan line video signal and said third scan line video signal to provide an interpolated video as said substitute video signal.

13. The bad channel detection and correction circuit of claim 11 wherein said means for providing said substitute video signal includes means for providing said delayed version of said first scan line video signal as said substitute video signal.

14. The bad channel detection and correction circuit of claim 11 wherein said delay means includes a plurality of serially coupled delay circuits.

15. The bad channel detection and correction circuit of claim 9 further including means for providing video histogram data for said first scan line video signal.

16. The bad channel detection and correction circuit of claim 15 wherein said analyzing means includes means for comparing respective characteristics of said difference histogram data and said video histogram data, and for determining on the basis of said comparison whether said difference histogram data is similar to said video histogram data.

17. The bad channel detection and correction circuit of claim 15 wherein said output means comprises:
   delay means responsive to the video signal for providing in parallel delayed versions of said first and second scan line video signals and a third video scan line;
   means responsive to said delay means for providing a substitute video signal; and
   switching means responsive to said decision output of said analyzing means for providing as said delayed video output signal said delayed version of said second scan line video signal or said substituted video signal.

18. The bad channel detection and correction circuit of claim 17 wherein said means for providing said substitute video signal includes means for interpolating said delayed versions of said first scan line video signal and said third scan line video signal to provide an interpolated video as said substitute video signal.

19. The bad channel detection and correction circuit of claim 17 wherein said means for providing said substitute video signal includes means for providing said delayed version of said first scan line video signal as said substitute video signal.

20. The bad channel detection and correction circuit of claim 17 wherein said delay means includes a plurality of serially coupled delay circuits.

21. A method for detecting and correcting the bad video signal from a bad video channel in a video imaging system having a plurality of video channels for providing a plurality of video scan lines, the steps comprising:
   determining histogram data based on the video signals for one or more video scan lines;
   analyzing the histogram data for providing a decision output indicative of whether the video signal for a particular video scan line is from a bad channel; and
   providing as a function of the decision output a delayed video output signal corresponding to (a) the video signal for the particular video scan line when the decision output indicates that the particular video scan line is from a good video channel, or (b) a substitute video signal for the particular scan line video signal when the decision output signal indicates that the particular scan line video signal is from a bad channel.

22. The method of claim 21 wherein the step of determining histogram data includes the step of determining difference histogram data for the difference between a first scan line video signal and a second scan line video signal.

23. The method of claim 22 wherein said step of analyzing includes the step of determining whether the difference histogram data has characteristics indicative of whether the first and second scan line video signals were provided by good video channels.

24. The method of claim 23 wherein the step of determining includes the steps of:
   calculating an average peak value for the difference histogram data;
   calculating an average area value for the areas around respective peaks of the difference histogram data; and
   comparing the average peak value and the average area values with predetermined thresholds.

25. The method of claim 23 further including the step of determining video histogram data for the first scan line video signal.

26. The method of claim 25 wherein the step of analyzing includes the step of comparing respective characteristics of the difference histogram data and the video histogram data, and for determining on the basis of such comparison whether the difference histogram data is similar to the video histogram data.

27. The method of claim 26 wherein the step of comparing includes the steps of:
   comparing the respective numbers of peaks of the difference histogram data and the video histogram data;
   comparing the respective numbers of valleys of the difference histogram data and the video histogram data;
   comparing the locations of the peaks of the difference histogram data with the locations of the peaks of the video histogram data;
   comparing the locations of the valleys of the difference histogram data with the locations of the valleys of the video histogram data; and
   determining on the basis of the foregoing steps of comparing whether the difference histogram dta is similar to the video histogram data.

* * * * *